(12) United States Patent
Quinn et al.

(10) Patent No.: US 9,148,629 B2
(45) Date of Patent: Sep. 29, 2015

(54) BUILD TO ORDER CONFIGURATION FOR INTEGRATED MOBILE TELEVISION APPLICATIONS IN MOBILE COMPUTING PLATFORMS

(75) Inventors: Liam Quinn, Austin, TX (US); Liam Prendergast, Limerick (IE)

(73) Assignee: Dell Products L.P., Round Rock, TX (US)

( * ) Notice: Subject to any disclaimer, the term of this patent is extended or adjusted under 35 U.S.C. 154(b) by 1664 days.

(21) Appl. No.: 12/194,009

(22) Filed: Aug. 19, 2008

(65) Prior Publication Data
US 2010/0050210 A1    Feb. 25, 2010

(51) Int. Cl.
| H04N 7/16 | (2011.01) |
| H04N 7/10 | (2006.01) |
| H04N 21/443 | (2011.01) |
| H04N 21/61 | (2011.01) |
| H04N 21/258 | (2011.01) |

(52) U.S. Cl.
CPC ........... *H04N 7/163* (2013.01); *H04N 21/4432* (2013.01); *H04N 21/6112* (2013.01); *H04N 21/25833* (2013.01)

(58) Field of Classification Search
CPC .............................................. H04N 21/25833
USPC ............................................. 725/5, 140, 34
See application file for complete search history.

(56) References Cited

U.S. PATENT DOCUMENTS

| 7,123,669 | B2 | 10/2006 | Ye et al. | |
| 2008/0222707 | A1* | 9/2008 | Pathuri et al. | 726/4 |
| 2008/0229359 | A1* | 9/2008 | Robinson | 725/46 |
| 2008/0300984 | A1* | 12/2008 | Li | 705/14 |
| 2008/0307484 | A1* | 12/2008 | Dandekar et al. | 725/133 |
| 2009/0037901 | A1* | 2/2009 | Barajas et al. | 717/174 |
| 2009/0100475 | A1* | 4/2009 | Sharifi | 725/62 |

OTHER PUBLICATIONS

QUALCOMM, Media FLO, Flo Technology Overview, 2007.

* cited by examiner

*Primary Examiner* — Nasser Goodarzi
*Assistant Examiner* — Michael Hong
(74) *Attorney, Agent, or Firm* — Terrile, Cannatti, Chambers & Holland, LLP; Stephen A. Terrile

(57) ABSTRACT

A process for using a build to order model to enable factory installation and user setup configuration of integrated mobile television devices for pre-selected mobile TV services. The process pre-configures a receiver (such as a DVB-H type receiver) to quickly tune to the desired DVB-H band/channel and to provide pre-selected application and service information to the customer. Such a process assists a customer to utilize more readily their new integrated mobile television device. In certain embodiments, the process focuses on the DVB-H standard.

12 Claims, 5 Drawing Sheets

BUILD TO ORDER CONFIGURATION FOR INTEGRATED MOBILE TELEVISION APPLICATIONS IN MOBILE COMPUTING PLATFORMS

BACKGROUND OF THE INVENTION

1. Field of the Invention

The present invention relates to information handling systems and more particularly to build to order configuration for integrated mobile television applications in mobile computing platforms (i.e., integrated mobile television devices).

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Mobile Digital Broadcast TV (DTV) combines two popular consumer products television and mobile phones/computing platforms. Similar to most new technologies, there are several different worldwide standards for mobile DTV. These standards include Digital Video Broadcasting-Handheld (DVB-H), Integrated Services Digital Broadcasting-Terrestrial (ISDB-T), MediaFLO, Digital Multimedia Broadcasting (DMB), Digital Audio Broadcasting-Internet Protocol (DAB-IP), and other regional variants.

The services and integrated devices are internet protocol (IP) based and often require user setup configuration based on the service model selected by the customer. This is further compounded by different technology and modulation architectures for North America, Europe, and Asia.

SUMMARY OF THE INVENTION

In accordance with the present invention, a process for using a build to order model to enable factory installation and user setup configuration of integrated mobile television devices for pre-selected mobile TV services is set forth. The process pre-configures a receiver (such as a DVB-H receiver) to quickly tune to the desired DVB-H band/channel and to provide pre-selected application and service information to the customer. Such a process assists a customer to utilize more readily their new integrated mobile television device. In certain embodiments, the process focuses on the DVB-H standard.

In one embodiment, the invention relates to a method of preconfiguring an integrated television device contained within an information handling system that includes obtaining customer television usage information while an information handling system is being configured, configuration of the information handling system resulting in a configured information handling system order, associating the customer television usage information with the configured information handling system order, and preconfiguring the information handling system to operate the integrated television device while fabricating the information handling system based upon the customer television usage information.

In another embodiment, the invention relates to an information handling system that includes a processor, an integrated television device coupled to the processor, and memory coupled to the processor and the integrated television device. The memory stores a system for preconfiguring the integrated television device, which system includes instructions executable by the processor for configuring the information handling system to operate the integrated television device based upon the customer television usage information. The configuration is based upon customer television usage that is obtained while configuring the information handling system. Instructions for configuring the information handling system are loaded on the memory while fabricating the information handling system.

In another embodiment, the invention relates to an apparatus for preconfiguring an integrated television device included within an information handling system that includes means for obtaining customer television usage information while an information handling system is being configured, configuration of the information handling system resulting in a configured information handling system order, means for associating the customer television usage information with the configured information handling system order, and means for preconfiguring the information handling system to operate the integrated television device of while fabricating the information handling system based upon the customer television usage information.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
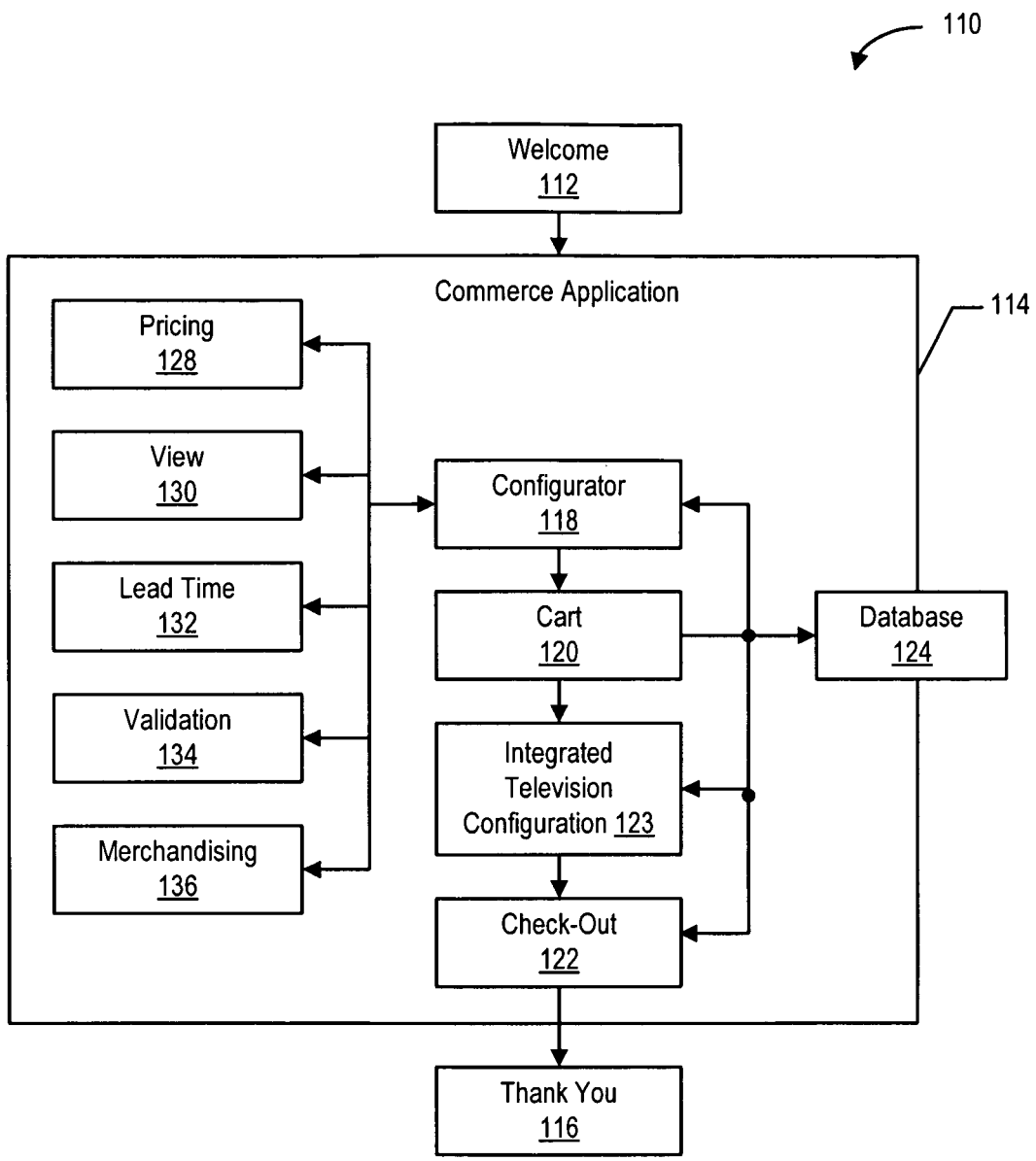
FIG. 1 shows an overview of a block diagram representation of an on-line store.

Referring to FIG. 1, an on-line store 110 for use in generating customer configured information handling systems, e.g., customer configured computer systems, is shown. The on-line store 110 includes a welcome or introductory module 112, a commerce application module 114, and a thank you module 116. The on-line store 110 includes an on-line store user interface that enables the system configuration, pricing, and ordering of an information handling system via the Internet. The commerce application 114 includes a configurator 118, shopping cart 120, a checkout module 122, an integrated television configuration module 123, and database 124. The database 124 provides information to the configurator 118, shopping cart 120, checkout module 122, and integrated television configuration module 123. The configurator 118 includes a pricing module 128, a view module 130, a lead-time warning module 132, a validation (or compatibility) warning module 134, and a merchandising module 136. The various modules of the configurator 118 are driven by data from the database 124, and thus the configurator 118, shopping cart 120, checkout module 122, and integrated television configuration module 123 are all linked to the database 124.

In operation of the on-line store 110, the welcome module 112 presents a welcome page 112, the configurator 118 presents a configurator page, the shopping cart 120 presents a shopping cart page, the checkout module 122 presents a checkout page, the integrated television configuration module 123 presents an integrated television configuration page, and the thank you module 116 presents a thank you page. The welcome page includes a static page and generally resides outside of the commerce application 114. The configurator page, shopping cart page, checkout page and services activation page are within the commerce application and use information provided by the database. The checkout includes a payment feature, delivery feature, personal verses business feature, and instructional text features (i.e., how to fill out an on-line form.)

The welcome page is typically an introductory page and includes a link into the on-line store 110. The welcome page is typically a static welcome page. Upon completion of configuration of a system, a customer is transferred to an integrated television configuration page in which the customer is provided an opportunity to provide information that can be used to preconfigure an integrated television on the system. After completion of the integrated television configuration module 123, the customer is transferred to a checkout page. After completion of the checkout, the customer is transferred to a static thank you page 116. The thank you page 116 provides a message of gratitude to the customer for having placed the order or for visiting the on-line store.

Aspects of the configurator 118 that interact with database 124 are shown in FIG. 1. In essence, the entire commerce application 114 interacts with the database. The configurator 118, shopping cart 120, checkout module 122, and integrated television configuration module 123 are each part of the commerce application 114 and interact with the database 124. For example, with the shopping cart 120, additional merchandising information associated with a particular system that has been configured and placed in the shopping cart by an on-line store customer can be provided.

Also for example, various information may be requested or automatically obtained from the customer by the integrated television configuration module 123 based upon the type of system ordered as well as components that are included within the system ordered. Additionally, by providing the integrated television configuration module 123 within the commerce application 114, the customer continues the experience a similar customer experience and the system provider is able to use the information from the database 124 and to maintain control over the customer contact. By maintaining control over the customer contact, the system provider is able to determine information relating to the integrated television device and to maintain accurate and up to date records of the integrated television device.

When a customer places an order for the integrated mobile television device via the configurator, the customer is provided with the ability to select their location and broadcast network operator and service provider via the integrated television configuration module 123. This information is used to pre-configure the integrated mobile television device with default network and service information for the selected broadcast network operator and customer location.

More specifically, certain integrated mobile television device receivers such as DVB-H type receiver's tune across a wide frequency range in the Ultra High Frequency (UHF) bands (470-860 MHz) and tune to the L-band (e.g., 1670-1675 MHz). The channel bandwidths for the receiver can be 5, 6, 7, or 8 MHz. The frequency range and channel bandwidth are examples of configurable receiver characteristics.

If the DVB-H receiver is to be used in certain geographic locations (e.g., Europe) the spectrum usage can vary from country to country. Such a situation can place heavy demands on a DVB-H type integrated mobile television device receiver as the receiver must select a 5, 6, 7 or 8-MHz wide channel depending on the location of the receiver from the entire band of channels. Additionally much of the existing frequency spectrum in the UHF bands is made up of various analog and terrestrial digital TV (DVB-T) signals that could have large signal amplitudes compared to the wanted DVB-H mobile TV signal.

Certain types of services such as the DVB-H service are predominantly (but not necessarily exclusively) provided via cellular services. Thus, the interaction (i.e., the return) channel of the service is often via a network of a cellular service provider. The DVB-H broadcast network operator may or may not be the same cellular service provider. All of these variables are considered when preconfiguring the integrated mobile television device.

Additionally, there are a plurality of mobile content services, including incumbent carriers, third party providers, and Mobile Virtual Network Operators (MVNOs). Each mobile content carrier may have certain configurable receiver variables.

Figure 2:
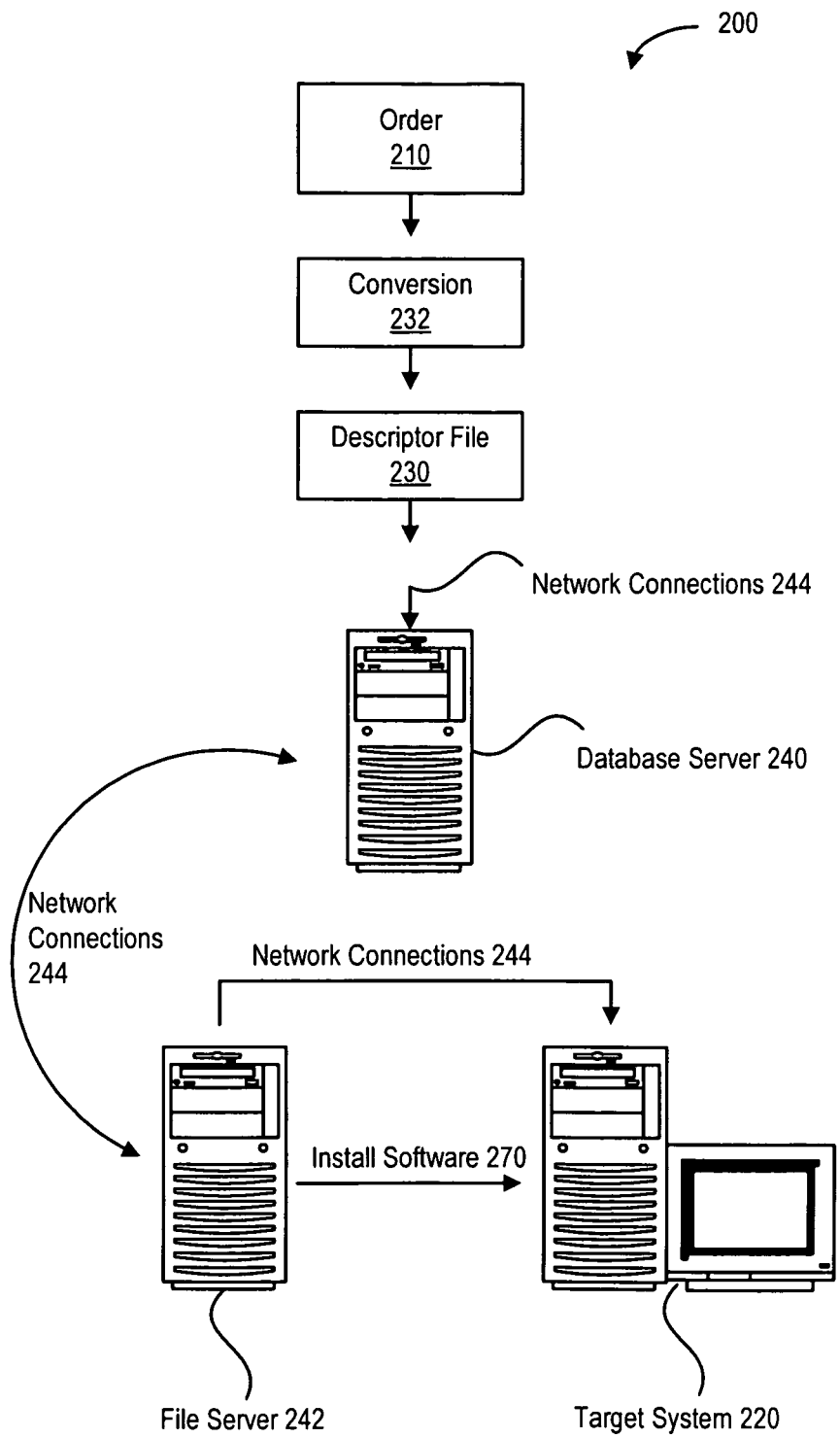
FIG. 2 shows an example of an automated build to order system for installing fixed image software on an information handling system.

Referring to FIG. 2, a schematic diagram of a software installation system 200 at an information handling system-manufacturing site is shown. In operation, an order 210 is placed to purchase a target information handling system 220. The target information handling system 220 (e.g., a fixed image platform) to be manufactured contains a plurality of hardware and software components. For instance, target information handling system 220 might include a certain brand of hard drive, a particular type of monitor, a certain brand of processor, and software. The target information handling system 220 might also include an integrated television device. The software includes a particular version of an operating system along with all appropriate driver software and other application software along with appropriate software bug fixes. The software can also include software for operating with an integrated television device as well as the preconfiguration information for preconfiguring the integrated television device.

Before target information handling system 220 is shipped to the customer, the plurality of components are installed and tested from, for example, a fixed image of the software. Such software installation and testing advantageously ensures a reliable, working information handling system which is ready to operate when received by a customer.

Because different families of information handling systems and different individual computer components require different software installation, it is necessary to determine which software to install on a target information handling system 220. A descriptor file 230 is provided by converting an order 210, which corresponds to a desired information handling system having desired components, into a computer readable format via conversion module 232. The descriptor file 230 can also include which content to load on the system.

Component descriptors are computer readable descriptions of the components of target information handling system 220 which components are defined by the order 210. In a preferred embodiment, the component descriptors are included in a descriptor file called a system descriptor record which is a computer readable file containing a listing of the components, both hardware and software, to be installed onto target information handling system 220. Having read the plurality of component descriptors, database server 240 provides a plurality of software components corresponding to the component descriptors to file server 242 over network connection 244. Network connections 244 may be any network connection well known in the art, such as a local area network, an intranet, or the internet. The information contained in database server 240 is often updated such that the database contains a new factory build environment. These updates can include new content to install onto the fixed image platform. The software is then installed 270 on the target information handling system 220. The software installation is controlled by a software installation management server that is operable to control the installation of the operating system and other software packages specified by a customer.

Figure 3:
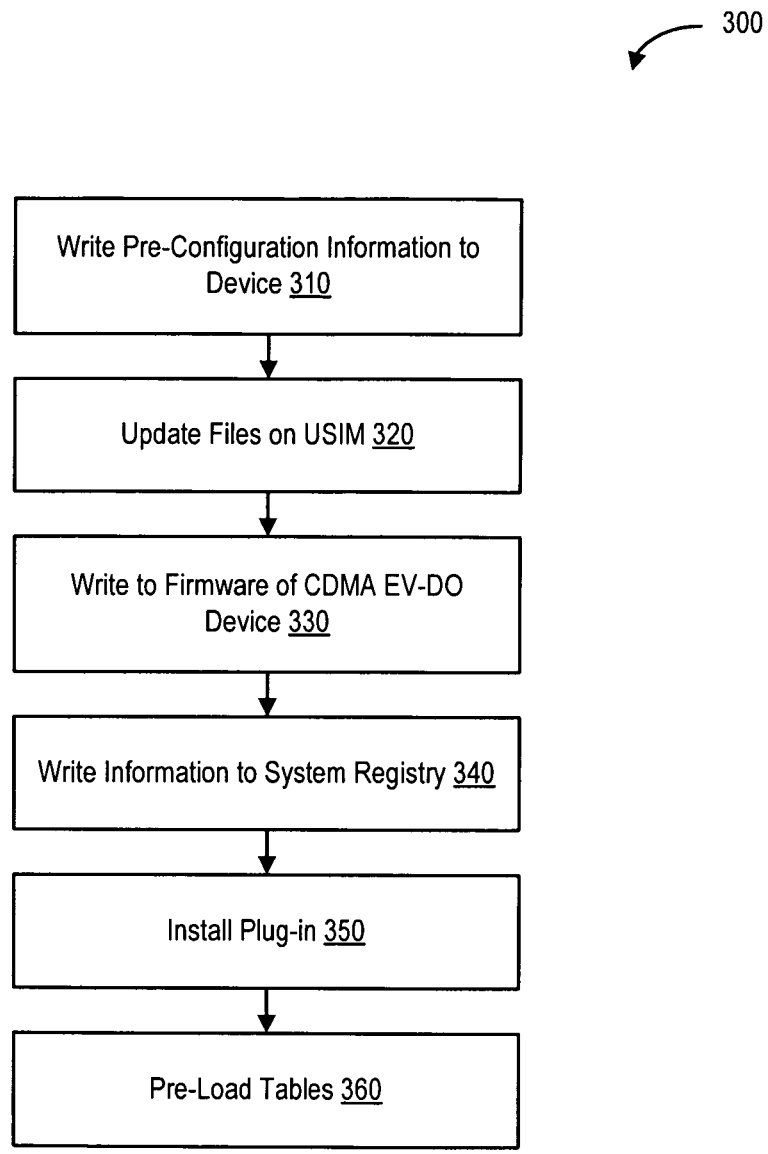
FIG. 3 shows a flow chart of the operation of configuring an integrated mobile television device.

Referring to FIG. 3, a flow chart of the operation of configuring an integrated mobile television device is shown. The pre-configuration of the integrated mobile television device is performed during the factory installation process. Depending on the type of integrated mobile television device, the pre-configuration may be performed by one, or a combination of methods.

More specifically, the pre-configuration can be performed by writing information directly to the DVB-H type integrated mobile television device, i.e. by updating the device's firmware at step 310. The pre-configuration can also be performed by updating files on a Universal Subscriber Identity Module (USIM) (if the device (e.g., a portable device such as a notebook) also contains a 3G cellular device that provides an interaction channel) at step 320. The pre-configuration can also be performed by writing to the firmware of a Code Division Multiple Access Evolution Data Optimized (CDMA EV-DO) device that provides an interaction channel (back channel service) at step 330. The pre-configuration can also be performed by writing information to the system registry that is then accessed by the DVB-H device application at step 340. The pre-configuration can also be performed by installing a plug-in that is then used by the DVB-H device application at step 350.

Additionally, in certain embodiments, a DVB-H type integrated mobile television device is pre-loaded with DVB-H service and program information tables at step 360, based on the customer information provided during the configuration and ordering process. In certain embodiments, the tables are pre-configured with default settings based on the customer location and service preference. The customer location may be input by the customer during the configuration process or may be automatically detected during the configuration and ordering process (e.g., this information may be obtained from billing information that is provided by the customer during the order process). These default settings will be valid for the customer's initial service access. The network information settings contained in the service information tables are accessed when the device initializes and attaches to the network. These settings are unlikely to change unless the customer changes networks at a later date.

The default service setting can be readily changed by the customer after they have received the initial service. The customer pre-configuration information may also be stored in a target configuration server, which may be used to re-flash the devices in the event of a change of service.

Figure 4:
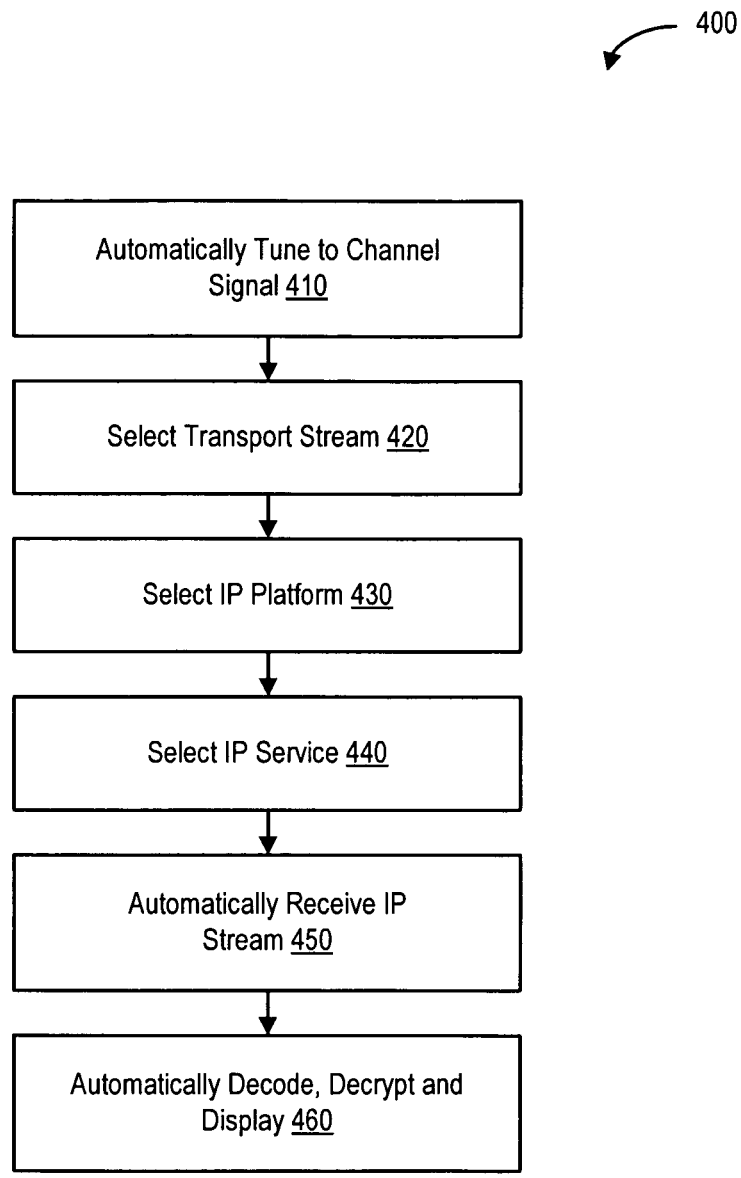
FIG. 4 shows a flow chart of the operation of initialization of an integrated mobile television device.

Referring to FIG. 4, the service and program information tables assist the integrated mobile television device to perform automatically a plurality of steps for the customer upon powering on the integrated DVB-H device. More specifically, the pre-loading, pre-configuration, and pre-selection of settings enable the device to automatically tune to and acquire the (pre-configured) DVB-H channel signal at step 410. Additionally, the pre-loading, pre-configuration and pre-selection of settings enables the device to select the (pre-selected) transport stream at step 420. Additionally, the pre-loading, pre-configuration and pre-selection of settings enables the device to select an appropriate IP platform (based on pre-configured information in the pre-loaded network information table) at step 430. Additionally, the pre-loading, pre-configuration and pre-selection of settings enables the device to select the (pre-selected) IP service at step 440. Additionally, the pre-loading, pre-configuration, and pre-selection of settings enable the device to receive automatically the IP stream carrying the pre-selected IP datagram stream at step 450. Additionally, the pre-loading, pre-configuration, and pre-selection of settings enable the device to automatically decode, decrypt, and display the video and audio payload stream at step 460.

Figure 5:
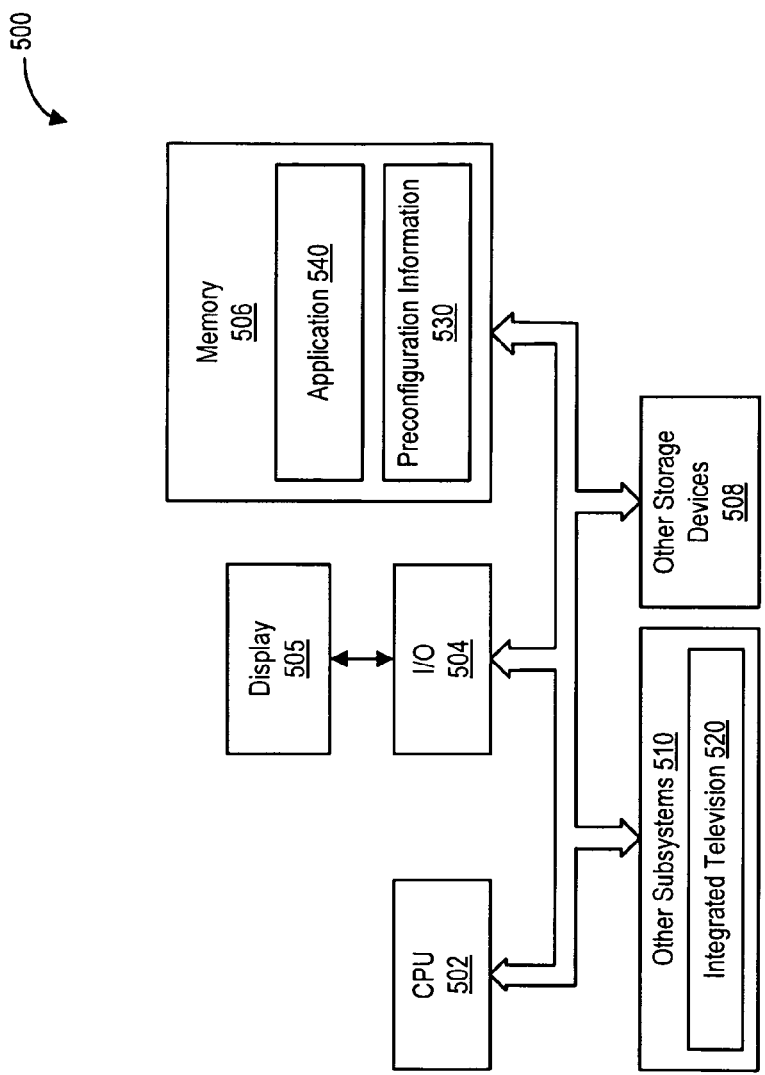
FIG. 5 shows a block diagram on an example information handling system that includes an integrated mobile television device.

Referring to FIG. 5, an example of an integrated mobile television device 500, such as the target information handling system 220, is shown. The information handling system 500 includes a processor 502, input/output (I/O) devices 504, such as a display, a keyboard, a mouse, and associated controllers, a memory 506, including both volatile memory such as Random Access Memory and non-volatile memory such as a hard disk and drive, and other storage devices 508, such as a floppy disk and drive and other memory devices, and various other subsystems 510, all interconnected via one or more buses 512. The other subsystems 510 can include an integrated television device 520. The information handling system 500 also includes integrated television preconfiguration information 530, and an application 540 that accesses the integrated television preconfiguration information 530, stored on the non-volatile memory and used to preconfigure the integrated television device 520.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method of preconfiguring an integrated television device included within an information handling system comprising:
    obtaining customer television usage information while an information handling system is being configured, the customer television usage information being automatically obtained based upon a type of information handling system being configured and components included with the information handling system being configured;
    configuration of the information handling system resulting in a configured information handling system order;
    associating the customer television usage information with the configured information handling system order; and,
    preconfiguring the information handling system to operate the integrated television device while fabricating the information handling system based upon the customer television usage information; and wherein
    the preconfiguration pre-configures a receiver to quickly tune to a desired band and channel and to provide pre-selected application and service information to the customer; and wherein
    the receiver comprises a Digital Video Broadcasting-Handheld (DVB-H) type receiver;
    a frequency range and channel bandwidth of the DVB-H type receiver are configurable receiver characteristics; and,
    the preconfiguration enables the DVB-H type receiver to receive desired DVB-H bands and channels.

2. The method of claim 1 further comprising:
using a build to order model to enable factory installation and user setup configuration of the integrated mobile television device for pre-selected mobile television services.

3. The method of claim 1 wherein:
the preconfiguration is performed by at least one of writing information directly to a Digital Video Broadcasting-Handheld (DVB-H) type integrated mobile television device; updating files on a Universal Subscriber Identity Module (USIM); writing to firmware of a Code Division Multiple Access Evolution Data Optimized (CDMA EV-DO) device that provides an interaction channel; writing information to a system registry that is accessed by a DVB-H device application; and installing a plug-in that is used by the DVB-H device application.

4. The method of claim 1 wherein:
the preconfiguration is performed by pre-loading a Digital Video Broadcasting-Handheld (DVB-H) type integrated mobile television device with DVB-H service and program information tables.

5. An information handling system comprising:
a processor;
an integrated television device coupled to the processor;
memory coupled to the processor and the integrated television device, the memory storing a system for preconfiguring the integrated television device, the system comprising instructions executable by the processor for
    configuring the information handling system to operate the integrated television device based upon the customer television usage information, the customer television usage information being automatically obtained based upon a type of information handling system being configured and components included with the information handling system being configured, the configuring being based upon customer television usage, the customer television usage information being obtained while configuring the information handling system, the instructions for configuring the information handling system being loaded on the memory while fabricating the information handling system; and wherein
    the configuration of the information handling system to operate the integrated television pre-configures a receiver of the integrated television to tune quickly to a desired band and channel and to provide pre-selected application and service information to the customer; and wherein
the receiver comprises a Digital Video Broadcasting-Handheld (DVB-H) type receiver;
a frequency range and channel bandwidth of the DVB-H type receiver are configurable receiver characteristics; and,
the preconfiguration enables the DVB-H type receiver to receive desired DVB-H bands and channels.

6. The information handling system of claim 5 wherein:
the information handling system is fabricated using a build to order model to enable factory installation and user setup configuration of the integrated mobile television device for pre-selected mobile television services.

7. The information handling system of claim 5 wherein:
the configuration is performed by at least one of writing information directly to a Digital Video Broadcasting- Handheld (DVB-H) type integrated mobile television device; updating files on a Universal Subscriber Identity Module (USIM);

writing to firmware of a Code Division Multiple Access Evolution Data Optimized (CDMA EV-DO) device that provides an interaction channel; writing information to a system registry that is accessed by a DVB-H device application; and installing a plug-in that is used by the DVB-H device application.

8. The information handling system of claim 5 wherein:
the configuration is performed by pre-loading a Digital Video Broadcasting-Handheld (DVB-H) type integrated mobile television device with DVB-H service and program information tables.

9. An apparatus for preconfiguring an integrated television device included within an information handling system comprising:

means for obtaining customer television usage information while an information handling system is being configured, the customer television usage information being automatically obtained based upon a type of information handling system being configured and components included with the information handling system being configured, configuration of the information handling system resulting in a configured information handling system order;

means for associating the customer television usage information with the configured information handling system order; and, means for preconfiguring the information handling system to operate the integrated television device of while fabricating the information handling system based upon the customer television usage information; and wherein preconfiguration pre-configures a receiver to quickly tune to a desired band and channel and to provide pre-selected application and service information to the customer; and wherein the receiver comprises a Digital Video Broadcasting-Handheld (DVB-H) type receiver;

a frequency range and channel bandwidth of the DVB-H type receiver are configurable receiver characteristics; and, the preconfiguration enables the DVB-H type receiver to receive desired DVB-H bands and channels.

10. The apparatus of claim 9 further comprising:
means for using a build to order model to enable factory installation and user setup configuration of the integrated mobile television device for pre-selected mobile television services.

11. The apparatus of claim 9 wherein:
the preconfiguration is performed by at least one of writing information directly to a Digital Video Broadcasting-Handheld (DVB-H) type integrated mobile television device; updating files on a Universal Subscriber Identity Module (USIM); writing to firmware of a Code Division Multiple Access Evolution Data Optimized (CDMA EV-DO) device that provides an interaction channel;

writing information to a system registry that is accessed by a DVB-H device application; and installing a plug-in that is used by the DVB-H device application.

12. The apparatus of claim 9 wherein:
the configuration is performed by pre-loading a Digital Video Broadcasting-Handheld (DVB-H) type integrated mobile television device with DVB-H service and program information tables.

* * * * *